United States Patent [19]

Hartmann

[11] Patent Number: 4,957,683

[45] Date of Patent: Sep. 18, 1990

[54] PROCESS FOR PRODUCING A PIPE SECTION AND COMPOUND PIPE PRODUCED ACCORDING TO THIS PROCESS

[76] Inventor: Peter Hartmann, General-Willestrasse 115, Feldmeilen, Switzerland

[21] Appl. No.: 11,442

[22] Filed: Feb. 5, 1987

Related U.S. Application Data

[63] Continuation of Ser. No. 687,016, Dec. 28, 1984, abandoned.

[30] Foreign Application Priority Data

Jan. 19, 1984 [CH] Switzerland .............................. 243/84

[51] Int. Cl.$^5$ ................................................ B28B 1/20
[52] U.S. Cl. ..................................... 264/256; 264/255; 264/270; 264/311
[58] Field of Search ................. 264/256, 270, 255, 311

[56] References Cited

U.S. PATENT DOCUMENTS

| | | | |
|---|---|---|---|
| 3,217,077 | 11/1965 | Cocke ................................... | 264/256 |
| 4,171,626 | 10/1979 | Yates et al. ......................... | 428/36 |
| 4,183,883 | 1/1980 | Blair ..................................... | 264/255 |
| 4,292,364 | 9/1981 | Wesch et al. ........................ | 428/286 |

FOREIGN PATENT DOCUMENTS

| | | | |
|---|---|---|---|
| 2352843 | 4/1975 | Fed. Rep. of Germany . | |
| 2068167 | 3/1972 | France ................................ | 264/256 |
| 53-117065 | 10/1978 | Japan .................................. | 264/256 |
| 56-142034 | 11/1981 | Japan .................................. | 264/256 |
| 804456 | 2/1981 | U.S.S.R. ............................. | 264/256 |
| 910631 | 11/1962 | United Kingdom ................ | 264/256 |

*Primary Examiner*—James Derrington
*Attorney, Agent, or Firm*—Weingarten, Schurgin, Gagnebin & Hayes

[57] ABSTRACT

The wall of the pipe section comprises a plurality of superimposed layers, which are formed from plastic and inorganic materials. The layer of inorganic materials forms the central layer, whose wall portions are in each case connected by a connecting layer to a reinforcing layer. While the central layer ensures the dimensional rigidity of the pipe section, the two reinforcing layers, which are made from a fiber-reinforced plastic, ensure the strength of the pipe. This combination of different layers is an inexpensive solution, which only requires that amount of expensive plastic as is required for the strength of the pipe. Through applying a plastic protective layer to the outer circumference of the pipe and a protective layer to the inner circumference of the pipe, the durability of the pipe section is ensured.

8 Claims, 1 Drawing Sheet

4,957,683

PROCESS FOR PRODUCING A PIPE SECTION AND COMPOUND PIPE PRODUCED ACCORDING TO THIS PROCESS

This application is a continuation of application Ser. No. 687,016, filed Dec. 28, 1984, now abandoned.

BACKGROUND OF THE INVENTION

The present invention relates to a process for producing a pipe section in a rotary mold drum, in which the pipe wall is formed by introducing liquid plastic, as well as fillers and/or reinforcing materials, accompanied by the formation of a material layer on the inner wall of the mold drum.

Considerable development has taken place in the production of tubular workpieces, in which no metallic materials are used. Various different construction stages are known and in connection with all of these it is assumed that at least one part is made from one or more plastic materials. Apart from pipeline parts made from a single plastic material and which can be produced without difficulty, e.g. with the aid of an extruder, production processes are known in connection with larger pipe diameter designs, in which the plastic if reinforced with additives. It is known to reinforce plastics for such pipe line parts by using fibrous materials of carbon, glass, boron, etc.

In the case of pipeline parts, particularly those having larger diameters, it is often desired that such parts have greater dimensional rigidity than can be achieved with plastic alone. Thus, it is known to reduce the flexibility of the plastic pipeline part by combining different types of material with the plastic, e.g. fibers (U.S. Pat. No. 4,171,626). In addition, building materials, e.g. moldings are known (DE-OS No. 2 352 384), which comprise several layers of different materials. For this purpose it is possible to use inorganic materials with corresponding binders, e.g. mortar or concrete. Although the moldings made from such materials have the desired dimensional rigidity, and the advantage also exists of these materials being generally less expensive than the suitable plastics, it is either not possible or only incompletely possible to achieve a reliable connection between the mortar or concrete and the plastic.

It is known in connection with the production of dimensionally rigid tubular parts from fiber reinforced plastic to use a rotary drum having the desired diameter and into which the plastic with the admixed fiber additives are introduced in the liquid state. The centrifugal action exerted by the charged plastic on rotating the drum leads to a uniform material distribution, so that a tubular material of uniform dimensional rigidity and strength is obtained. However, the amount of plastic required and consequently the costs of such tubular parts are high.

SUMMARY OF THE INVENTION

The object of the present invention is to so develop a process of the aforementioned type that tubular workpieces can be produced in dimensionally rigid and less expensive form.

According to the invention this problem is solved in that the pipe wall is built up by the superimposing of layers both of plastic and of inorganic materials, at least one inorganic material layer being applied as a central layer and the plastic layers are applied as the inner wall area and the outer wall area.

Another of the invention is to provide a compound pipe, in which the advantages of the process are utilized in a particularly advantageous manner. According to the invention this problem is solved in that in connection with the pipe wall the central layer comprising the cement mortar with or without mineral fillers or the concrete is joined by in each case one connecting layer formed from a filler-free and reinforcement-free polyester adhesive to the fixing layers.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The invention is based on the idea that it is particularly appropriate to use a rotary mold drum for the production of tubular workpieces of the type already used for producing fiber reinforced plastic pipes. It has hitherto only been possible with such a drum to produce tubular workpieces comprising plastics alone, the dimensional rigidity being obtained by adding a fiber reinforcement.

However, it is the aim of the present invention not only to produce a dimensionally stable tubular workpiece, but to carry this out in an inexpensive manner, as will be described hereinafter.

Figure 1:
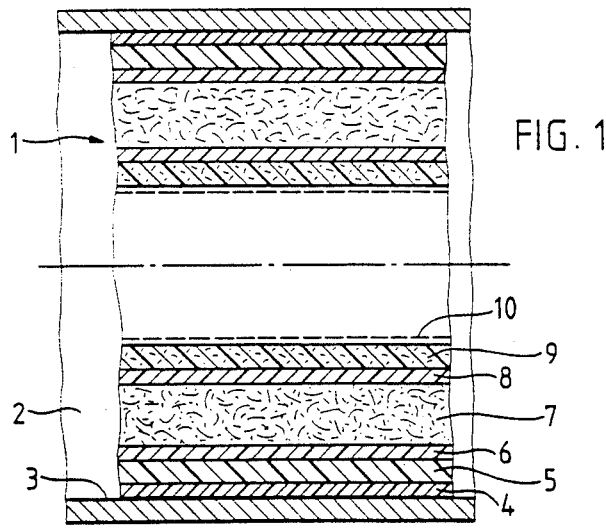
FIG. 1 a longitudinal section through part of a compound pipe.

FIG. 1 shows in vertical section a detail of a compound pipe 1, which can be produced in a rotary drum. Nevertheless, the construction differs completely from the tubular workpieces made from fiber-reinforced plastic which has hitherto been produced in drums.

In FIG. 1, the completed compound pipe 1 is located in an only partly shown drum 2. In the latter, the compound pipe 1 is built up in layer or laminated form, until the final state shown in FIG. 1 is reached. However, the individual layers are not shown true to scale, because this would make the drawing difficult to understand. Instead the individual layers are in part shown larger and in part smaller.

In order to produce the compound pipe 1, drum 2 is rotated, circumferential speeds of 20 m/s and higher being reached on the inner wall 3 of drum 2. Firstly a protective layer 4 is applied to inner wall 3, for which purpose a plastic in the liquid state is applied and is introduced through the open face of drum 2 into the interior thereof by means of a displaceable dosing or metering arm and is uniformly distributed over the length of the compound pipe 1 to be produced, so that a uniform layer thickness of 0.7 to 1.2 mm is obtained. An unsaturated polyester resin without fiber reinforcement is used. Protective layer 4 serves to protect the inner layers and must consequently harden completely before the next layer is applied. Due to the addition of hardeners, protective layer 4 hardens within a few minutes.

Following the hardening of protective layer 4, a reinforcing layer 5 is applied and consists of a mixture of a polyester resin and a proportion of fibers. The resin is introduced into the rotary drum in the liquid state and after admixing a hardener, a temperature of approximarely 80° C. or higher is reached. While the liquid resin is flowing in, the fibers, preferably glass fibers are admixed. Admixing takes place e.g. directly before the resin meets the protective layer 4. The glass fibers are delivered in the form of reels and are supplied to a cutting mechanism mounted on the charging or feed arm, which cuts the said fibers into short lengths of approximately 4.5 cm, which are immediately thereafter admixed with the inflowing resin. The thickness of the reinforcing layer can be adapted to the intended use of the tubular workpiece and is between 1.5 and 6.0 mm. The proportion of fibers can also be selected in accordance with the intended use and is in the range 10 to 50% by weight. A higher glass fibers material proportion has not proved to be advantageous. In order that the glass fibers have a better alkali resistance, a surface treatement, e.g. with silane is carried out. A connecting layer 6 is then applied to the reinforcing layer 5 and only then does the latter undergo initial hardening.

The connecting layer 6 preferably also consists of a polyester resin, with which are admixed water and aluminium hydroxide, together with a hardener. However, no additive and in particular no fibers are admixed as reinforcing materials. This is important, because the function of the connecting layer 6 is to ensure a completely satisfactory connection between reinforcing layer 5 and a following central layer 7. As a result of the composition of the resin mixture and the omission of additives or reinforcing materials, it is ensured that the resin is applied in a substantially void-free, uniform manner, with a thickness of 0.5 and 2.0 mm to the reinforcing layer 5. Mixing with the hardener takes place in a die head directly prior to the application, so that the complete hardening time can be very short.

As soon as the connecting layer 6 is pasty, i.e. can still be pressed in with the finger, the central layer 7 is applied. The latter is constituted by a cement mortar with or without mineral fillers, or a concrete. For example, a suitable concrete contains 25% by weight sand of particle size 1 to 4 mm, 10% by weight cement and 46% by weight of water, based on the cement weight proportion. However, particularly in the case of large pipe diameters, it is possible to process larger particle sizes and this can be called molding sand. The sand and the cement are combined and mixed directly upstream of the feed arm, while the water is admixed just prior to molding. However, the concrete has still not set in this state.

Before the concrete is completely set, a second connecting layer 8 is applied to the central layer 7 and its composition completely coincides with the first-mentioned connecting layer 6.

As soon as connecting layer 8 has become pasty, a second reinforcing layer 9 is applied. The composition and thickness of the latter substantially corresponds to that of the first reinforcing layer 5, but can also have a greater thickness, e.g. between 3.5 and 6 mm. As a function of the intended use and the stressing of the workpiece, the thickness of the second reinforcing layer 8 can be varied within the aforementioned range.

As an optional measure, protective layer 10 can then be applied to the hardened second reinforcing layer 9. Protective layer 10 can in many cases have a corrosion protection function and e.g. comprises an unsaturated or isophthalic polyester resin, a vinyl ester or some other chemically stable special resin. The thickness of protective layer 10 can vary within a range of approximately 0.7 to 1.8 mm and this layer thickness is dependent on the intended use of the product. However, in many applications there is no need for protective layer 10, so that it is only shown in broken line form in FIG. 1.

As a result of the aforementioned construction of the tubular member 1, on the one hand the desired dimensional stability and on the other an adequate strength and corrosion resistance are obtained. The dimensional rigidity in ensured by central layer 7, whose thickness can be varied within a relatively wide range, e.g. between 8 and 300 mm and more. The necessary tensile strength is ensured by the two reinforcing layers 5, 9, so that the layer thickness need only be sufficient to reliably absorb the stresses which occur. As has been shown hereinbefore, there is only a relatively small plastic requirement.

It is relatively simple to produce a tubular member 1 in rotary drum 2. The uniform distribution of the layer materials and the dosing thereof can be achieved without difficulty. The essential problem is to reliably ensure the connection between the two reinforcing layers 5, 9, which are responsible for the strength, and the central layer 7. This problem is solved in a surprisingly simple manner in that the two connecting layers 6, 8 are applied without the addition of fillers or fibrous materials. The synthetic resin used for this is of the same type as the synthetic resin used in reinforcing layers 5, 9, and also has the characteristics of an adhesive, which is distributed in non-porous manner on the rough surface of central layer 7 and, for as long as it is pasty, intimately meshes with roughnesses on the surface of central layer 7. When the cement mortar or concrete of central layer 7 sets, the layer is subject to heating to approximately 30° C., while the engaging plastic layers reach a curing temperature of approximately 80° C., and higher. It has surprisingly been found that as a result it is possible to achieve a completely satisfactory connection between the two reinforcing layers 5, 9 ensuring the strength of tubular member 1 and the central layer 7 ensuring the dimensional rigidity thereof. As a result it is possible to produce very large diameter pipes, e.g. of 4 m and more with relatively limited expenditure.

Figure 2:
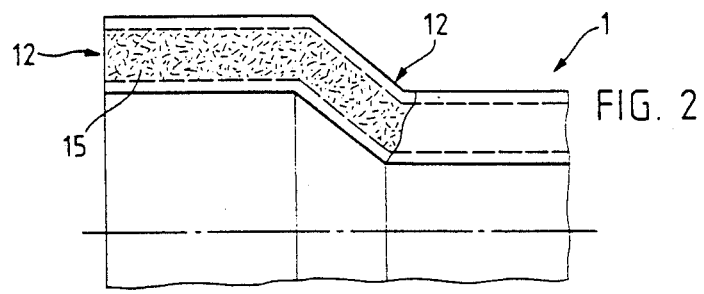
FIG. 2 a longitudinal section through a compound pipe with a socket shaped on to one end thereof.
Figure 3:
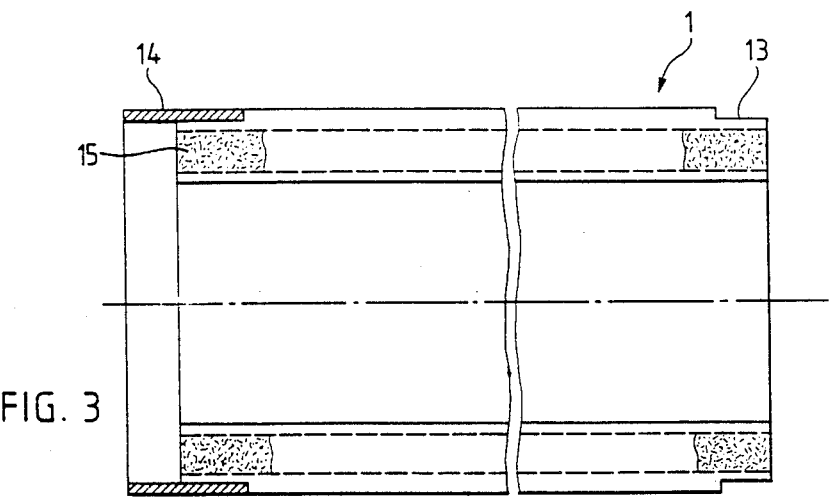
FIG. 3 a longitudinal section of a thrust pipe constructed as a compound pipe.

FIGS. 2 and 3 show two uses for the described tubular member 1.

FIG. 2 shows a tubular member 1 in the aforementioned layer or laminated structure, on to which is shaped a socket 12. The production of such a socket pipe can take place in the same way as described for the tubular member 1 according to FIG. 1. In this case, the mold drum 2 must be provided with a recess corresponding to socket 12 which, with the exception of the inner and outer wall plastic layers, is preferably made from a different material. A suitable material for this is e.g. a plastic concrete 15, i.e. a concrete whose binder is not inorganic and is instead a plastic, e.g. a polyester resin.

Following the application of the outer wall plastic layers, firstly the socket 12 is produced and then the tubular member 1 is produced in the aforementioned manner. This leads to an intimate connection between the material of socket 12 and the synthetic resins of the tubular member 1. FIG. 2 only shows the layer structure of tubular member 1 in a diagrammatic manner by means of two broken lines. However, the member 1 is produced in the manner described relative to FIG. 1.

FIG. 3 shows a thrust pipe, whose tubular member 1 is produced in the aforementioned manner and which is only indicated by two broken lines, plastic concrete 15, e.g. polyester concrete being used for the end portions. Here again, the mould drum differs from the smooth cylindrical shape and has a projection at one pipe end and as a result an offset portion 13 is formed in pipe 1. At the other pipe end, metal ring 14 is fixed to pipe 1. Ring 14 is placed in the mold drum before the start of pipe production and then the pipe 1 is formed in the aforementioned laminated manner. Part of the ring 14 is not covered by the layers of pipe 1, so that the uncovered part of the ring 14 of the following pipe can be inserted into offset portion 13. In this way, it is possible to lay pipes according to FIG. 3 in exactly the same way as metal pipes.

The production of the aforementioned pipe section will be further described relative to an example of a smooth pipe with a diameter D=11 m and a length L=4 m of the type used for producing sewage pipes.

All the materials are introduced in the liquid state into the mold drum, so that it is a wet-in-wet process and the pipe is constructed as follows:

| | |
|---|---|
| Protective layer 4: | Layer thickness 0.9 mm Material: unsaturated polyester resin |
| First reinforcing layer 5: | Layer thickness 2.0 mm Resin proportion 65% by weight Glass fiber proportion 35% weight |
| First connecting layer 6: | Layer thickness 1.5 mm |
| Central layer 7: | Layer thickness 50 mm Composition: 25% by weight sand of particle size 1 to 4 mm, 10% by weight cement, 46% by weight water, based on the cement |
| Second connecting layer 8: | Layer thickness 1.5 mm |
| Second reinforcing layer 9: | Layer thickness 4.0 mm Resin proportion 65% by weight, Glass fiber proportion 35% by weight |
| Protective layer 10: | Layer thickness 1.0 mm, Material: unsaturated polyester resin. |

The connecting layers 6, 8 are mixed from two components: one component with 40% by weight water, 55% by weight aluminium hydroxide and 5% by weight BP hardener and the other component 50% by weight polyester resin UP 292 and 50% by weight polyester resin UP 130.

The materials were introduced into the mold drum at a circumferential speed thereof of 20 m/s. The pipe was removed from the mold after 100 minutes and had then achieved its final shape. The production time can be reduced on increasing the capacity of the cement mixture and the pumps for applying the plastics.

What is claimed is:

1. A process for producing pipe sections in a rotary mold drum comprising: rotating the rotary mold drum to provide centrifugal forces to an inner mold drum surface and during rotation performing the steps of:
introducing onto the inner mold drum surface a protective layer of moldable plastic in a liquid state, said moldable plastic being free of fiber reinforcing material;
allowing said moldable plastic to cure to a hardened state by addition of a hardening agent;
applying a first reinforcing layer of fiber-reinforced plastic in a liquid state to said hardened protective layer;
applying a first connecting layer of fiber free plastic in a liquid state to the first reinforcing layer;
allowing said first connecting layer to cure to a partially hardened pasty state by addition of a hardening agent;
applying a central layer of inorganic material to the first connecting layer while the first connecting layer is in said partially hardened pasty state;
allowing said central layer of inorganic material to partially set;
applying a second connecting layer of fiber free plastic in a liquid state to be the central layer of inorganic material after the central layer of inorganic material is partially set;
allowing said second connecting layer to cure to a partially hardened pasty state by addition of a hardening agent; and
applying a second reinforcing layer of fiber-reinforced plastic in a liquid state to said partially hardened pasty second connecting layer.

2. A process according to claim 1 further including a step of allowing said second reinforcing layer to cure to a hardened state by addition of a hardening agent, and a step of applying a protective plastic layer for corrosion protecting purposes to said hardened second reinforcing layer, said protective plastic layer being essentially free of fiber-reinforcing material.

3. The process according to claim 1 further including steps of forming the first and second reinforcing layers by admixing fibers with the plastic prior to application thereof.

4. The process according to claim 1, wherein the first, liquid connecting layer is applied to the first reinforcing layer before the first reinforcing layer hardens.

5. The process according to claim 1 further including curing the pipe section in said rotary mold drum.

6. The process according to claim 1 wherein said step of applying a central layer of inorganic material comprises applying a central layer of concrete.

7. The process according to claim 1 wherein said step of applying a central layer of inorganic material comprises applying a central layer of mortar essentially free of mineral fillers.

8. The process according to claim 1 wherein said step of applying a central layer of inorganic material comprises applying a central layer of mortar having mineral fillers.

* * * * *

UNITED STATES PATENT AND TRADEMARK OFFICE
CERTIFICATE OF CORRECTION

PATENT NO. : 4,957,683
DATED : September 18, 1990
INVENTOR(S) : Peter Hartmann It is certified that error appears in the above-identified patent and that said Letters Patent is hereby corrected as shown below:

In Column 1, line 25, "plastic if" should read --plastic is--.

In Column 1, line 36, "384" should read --843--.

In Column 2, line 1, "Another of" should read --Another object of--.

Signed and Sealed this

Twenty-eighth Day of July, 1992

Attest:

DOUGLAS B. COMER

*Attesting Officer*     *Acting Commissioner of Patents and Trademarks*